United States Patent [19]

Keller

[11] Patent Number: 4,722,129

[45] Date of Patent: Feb. 2, 1988

[54] TOOL FOR EXTRACTING INSULATED WIRES FROM A SHIELDED CABLE

[75] Inventor: Ron F. Keller, San Jose, Calif.

[73] Assignee: GTE Government Systems Corporation, Stamford, Conn.

[21] Appl. No.: 944,916

[22] Filed: Dec. 22, 1986

[51] Int. Cl.$^4$ ............................................. B25B 27/14
[52] U.S. Cl. ...................................... 29/267; 29/239; 81/488
[58] Field of Search .................... 81/488; 29/267, 278, 29/239; 254/21, 25; 433/141, 143; 132/89, 93; 223/104; D28/64

[56] References Cited

U.S. PATENT DOCUMENTS 1,514,117 11/1924 Wilder ..................................... 7/169
4,559,957 12/1985 Hokama ................................ 132/93

FOREIGN PATENT DOCUMENTS 2939211 4/1980 Fed. Rep. of Germany ...... 443/141

Primary Examiner—Roscoe V. Parker
Attorney, Agent, or Firm—Douglas M. Gilbert

[57] ABSTRACT

A hand-held tool having an elongated rod-like body with an arcuately-shaped head tapered to a rounded point for use in removing insulated wires from the end of a braided shielded cable. The tip is intentionally rounded to prevent puncturing the insulation or catching on the braided wires when the tip is inserted between the wire insulation and the shield. The outer ½ of the tapered head portion has a substantially elliptical cross section, as opposed to simply circular, to distribute the load bearing forces across a greater surface area on the wire insulation when the wire is pulled out of the shield. The other ½ of the tapered head portion is a transition to the cylindrical body from the curved ellipsoidal section. In a preferred embodiment, the tool is constructed of a polycarbonate plastic with a smoothed surface on the tapered head portion to facilitate the insulated wires sliding across the surface during use. Also in a preferred embodiment the cylindrical body has two side walls to facilitate gripping of the tool by the user.

5 Claims, 9 Drawing Figures

TOOL FOR EXTRACTING INSULATED WIRES FROM A SHIELDED CABLE

BACKGROUND OF THE INVENTION

1. Field of the Invention

The present invention relates to electrical wiring techniques and more particularly to a tool useful in removing insulated wires from the ends of a braided shielded cable without damaging the wire insulation.

2. Description of the Prior Art

Many types of electronic shielded cables have one or more insulated conductors surrounded by a metallic braided shield which itself is covered by an outer layer of insulation, e.g. RG-58 or ECxx40-xSTx, are typical of such shielded cables. The braided shielding consists of a multitude of very fine wires woven into a continuous tubular braid. When electrically connected to a ground potential, the braided wires impede the transmission of electromagnetic fields thereby shielding the inner conductor(s) from unwanted extraneous signals—generally referred to as noise. The braided shield and the inner conductors may be electrically connected to a multitude of different types of pins, terminals, and connectors with the shield normally being grounded. When connecting up the wires in the shielded cable, the ends of the inner conductors are removed from the normal position inside the shielding by either unweaving the shielding and bending the wire mesh back or by poking the inner conductors through an opening in the mesh leaving the shield substantially intact. The later method is usually preferred since it is electrically equivalent to unweaving, but is economically superior since it automatically results in a "braid conductor" that is easily connected to a ground without soldering or other costly types of connectors.

In a manufacturing cable wiring process, where large numbers of shielded cables are used, the insulation is frequently damped in separating the insulated wires from the shield. Among the tools that have been used to grab the insulated wires to remove them from the shield are needle nose pliers, dental hooks, wood nails, stiff wire hooks, fishing hooks, straight wooden sticks (cuticle pushers), and the like. All of these nonspecific tools can and do occasionally damage the insulation covering the wires by puncturing the insulation, by bending the wires at too great an angle or by applying too great a force over too small an area. Unfortunately such damage often produces latent defects which, if gone undetected, can cause electrical shorts which results in malfunctions in the equipment used in conjunction therewith. Even if detected during manufacture (usually with high voltages being applied to the inner conductors) the faulty cables must be replaced and reassembled. Either outcome is expensive to the manufacturer.

Thus what is desired is a simple and cost effective technique and tool for extracting one or more insulated wires from the surrounding shield which does not do damage to the insulation on the inner wires.

SUMMARY OF THE INVENTION

In accordance with the teachings of the present invention, the problem of damaged or ruptured insulation caused by faulty assembly techniques is overcome. The hand-held tool comprises an elongated rod-like body having a rod-like configuration large enough to be held comfortably in the palm of an adult. One end of the tool is simply closed. The useful end or head is arcuately-shaped and tapered to a rounded point. The tip is intentionally rounded to prevent puncturing the insulation or catching on the braided wires when the tip is inserted between the wire insulation and the sheld. The outer ½ of the tapered head portion has a substantially elliptical cross section, as opposed to simply circular, to distribute the load bearing forces across a greater surface area on the wire insulation when the wire is pulled out of the shield. The other ½ of the tapered head portion is a transition to the cylindrical body from the curved ellipsoidal section. In a preferred embodiment, the tool is constructed of a polycarbonate plastic with a smoothed surface on the tapered head portion to facilitate the insulated wires sliding across the surface during use. Also in a preferred embodiment the cylindrical body has two side walls to facilitate gripping of the tool by the user.

The extraction tool hereinabove described is relatively inexpensive to fabricate, easy to use, and saves the manufacturer added expense by avoiding the cost of repairs caused by damaged wires in the shielded cables. And perhaps more importantly, it will improve the overall quality of the product produced by the manufacturer.

BRIEF DESCRIPTION OF THE DRAWINGS

For a better understanding of the invention as well as other objects and further features thereof, reference is made to the following description which is to be read in conjunction with the accompanying drawings wherein.

It should be noted that the same reference numerals identify identical components or parts in each of the figures.

DETAILED DESCRIPTION OF THE INVENTION

Figure 1:
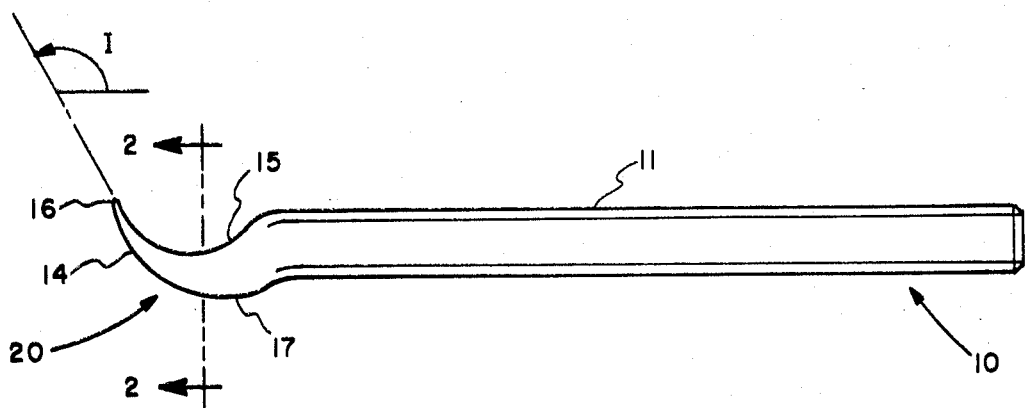
FIG. 1 is a side plane view of the preferred embodiment of the present invention.

For a better understanding of the subject invention, reference is made to the following description and appended claims in conjunction with the above-described drawings. Referring now to FIG. 1, depicted therein is a novel hand-held wire extraction tool 10 having a generally cylindrical body 11 and an arcuately-shaped tapered head 20. As will be described in more detail hereinafter, tool 10 may be used to extract the end portion of one or more insulated wires from inside a braided shield without damaging the insulation on the wires being extracted. Once extracted the insulated wires may be stripped and connected up in the standard manner.

Figure 2:
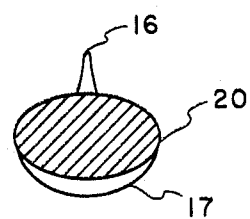
FIG. 2 is an enlarged transverse section (end view) taken on the line 2—2 of FIG. 1 rotated 90° to show the shape of the cross-sectional area of the tapered head 14.
Figure 3:
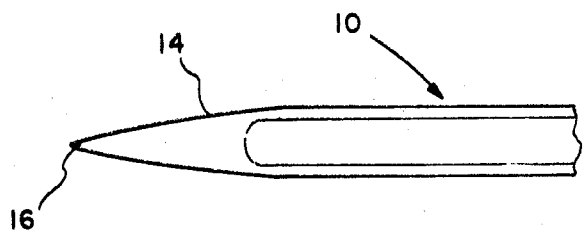
FIG. 3 is a top plane view of the right section of the preferred embodiment of the present invention.

The more useful part of the tool is the arcuately-shaped tapered head 20. As seen in the top view shown in FIG. 3, the head is uniformly tapered to a rounded point 16. The outer ½ of the head portion 14 has an aproximately elliptical cross section as depicted in FIG. 2 by the enlarged transverse section 2—2. Although a completely circular cross section would function almost as well, the elliptical shape is preferred. Its flatter surface 15 distributes the pushing forces applied to the insulation during the extraction process better than a perfectly circular surface. The lower or bottom ½ of the tapered head portion 14 makes a smooth transition to the rod-like body 11. In addition to being tapered, the head itself is arcuately shaped to provide a type of hook to cradle the wires as they are removed from inside the braid enclosure. The precise arc radius of the head is a matter of design choice depending upon the size of the cable and insulated wire in conjunction with which the tool is to be used. The larger the insulated wire, the larger the arc needs to be to hold the wires and the longer the tapered head needs to be. In the preferred embodiment of the present invention, the base of the head portion 17 protrudes slightly below the extension line of the rod body 11 as shown in FIGS. 1 and 2. The head tip 16 is inclined from the tool body 11 at an angle of inclination I of 135° to facilitate the head tip being slid under the wires within the shield. The head base 15 makes an angle with the tool body 11 of 125° to facilitate the wires being slid up onto the tool body 11. Here again the exact angles are a matter of design choice dependent upon many factors. The proper use of the tool is described in relation to the FIGS. 4–9.

Figure 4:
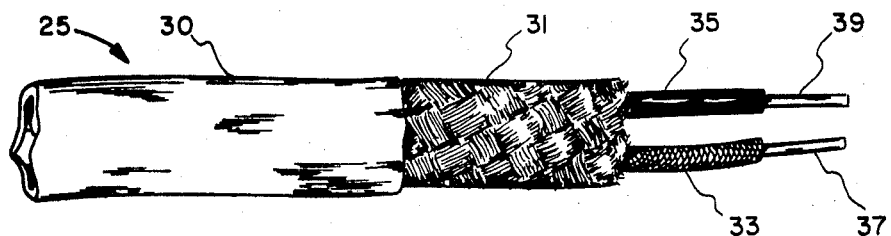
FIG. 4 shows a section of a standard twin lead shielded cable 25 to illustrate the various components therein.
Figure 5:
FIG. 5-9 depict the same shielded cable 25 to illustrate the various steps to be taken in the wire extraction process.
Figure 6:
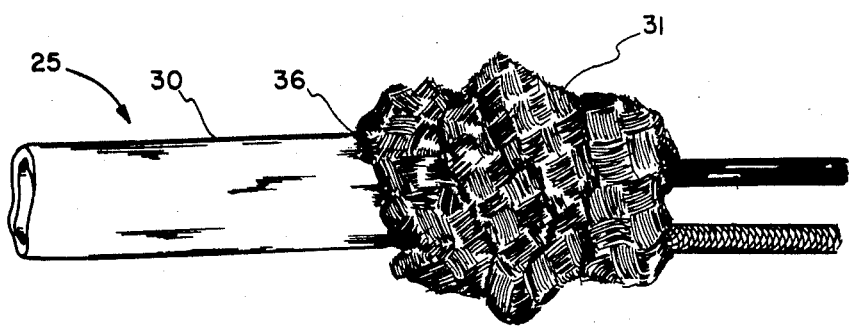
Figure 7:
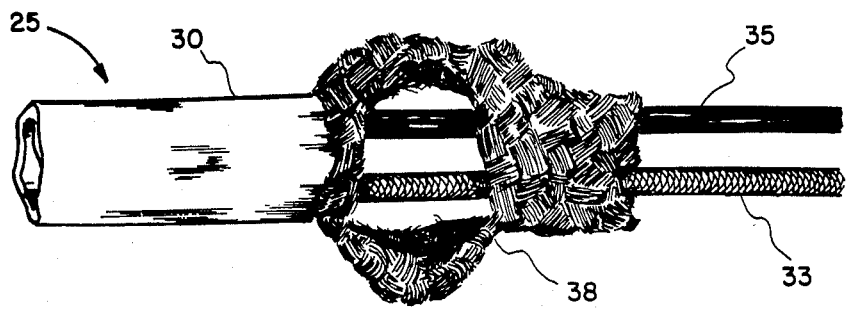

Referring now to FIG. 4, depicted therein is a section of a standard twin lead shielded cable 25 comprised of two inner conductors 37 and 39, covered with insulation 33 and 35, enclosed with a braided shield 31, which is covered with an additional layer of insulation 30. The remaining FIGS. 5–9 depict the same shielded cable 25 to illustrate the various steps to be taken in the wire extraction process. FIG. 5 shows cable 25 having a length of insulation removed exposing an end portion of the shield 31 (e.g. a 3-inch length might be typical). The braided shield 31 is then pushed or slid back against the edge 36 of outer insulation 30, as shown in FIG. 6, to distend a portion of shield 31 (preferably near the edge of the insulation) thereby loosening some of the individual strands of wire comprising the shield. Referring to FIG. 7, an opening 38 in the shield 31 is made to expose a short section of insulated wire within. This is done by spreading individual wire strands using the tip 16 of tool 10 or other pointed instrument. These steps are fairly standard and certainly are not unique to the present invention.

Figure 8:
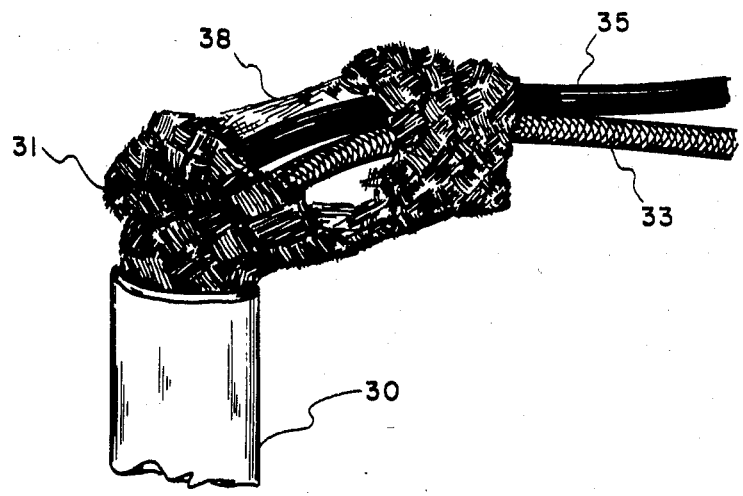
Figure 9:
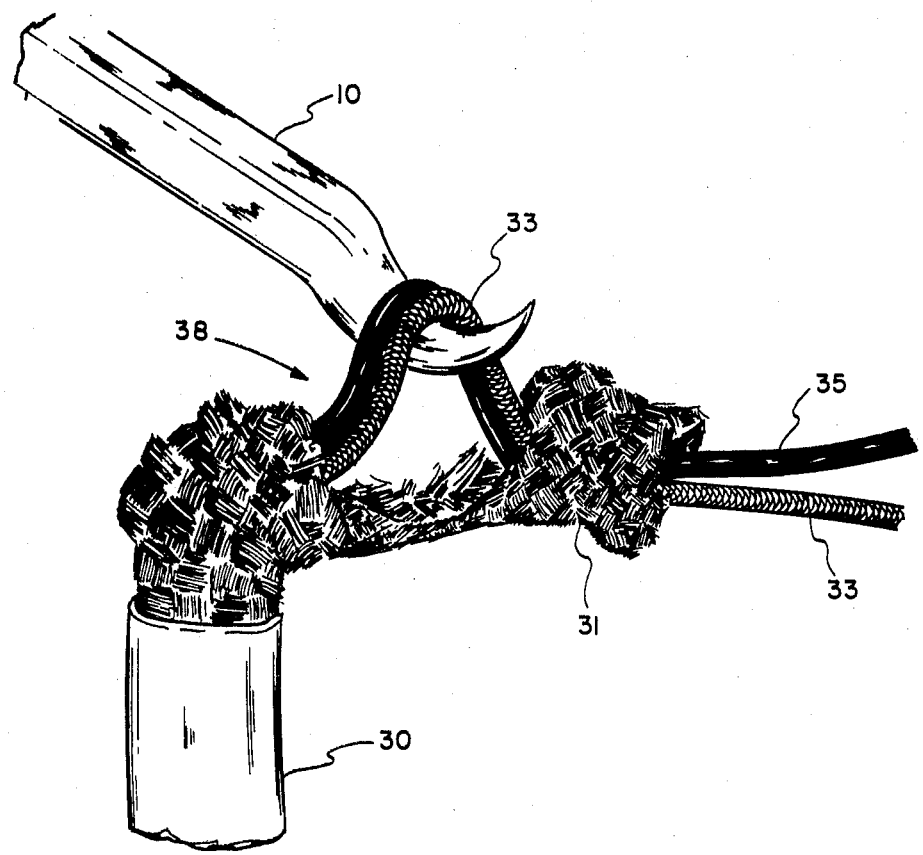

The next step is to bend the entire cable back at least 90°, as shown in FIG. 8, so as to expose the opening in the shield. This causes the opening in shield 31 to extend thereby providing easier access to the insulated wires 33 and 35 within. (For small gauge shieled cable the easiest way to bend the cable and open is to place the cable opening on top of the index finger bending back both ends with the thumb and third finger.) By mechanically flexing the cable back and forth, a small space can usually be produced between the insulated wire and the surrounding shield. The rounded tip 16 is carefully inserted within aperture 38 in the small space between the shield and the insulated wire increasing the separation between them. In a multi-wire cable the insulated wires may be extracted one or two at a time through the opening.

Once the tip 16 is just under the wire 33, the tool is rotated about the point of contact (using the insulated wire 33 as the axis of rotation) causing more of the tapered head 20 to be wedged between the shield 31 and wire 33 being extracted. This pivoting action also lifts the wire to the edge of the shield opening and beyond. To facilitate wedging head 20 under wire 33, tool 10 may be twisted with a back and forth motion ($\pm 30°$) about the longitudinal axis of body 11 while pushing head 20 under the insulated wire being removed. The tool operator must push the tool head 20 between the insulated wire and the shield completely past the tool head 20 to the tool body 11. When an amount of insulated wire 33 rests on tool body 11, the insulated wire is completely pulled (or pushed) out of the shield opening with the extraction tool. An insufficient amount of insulated wire 33 resting on the tool can cause the insulated wire to bend at too great an angle and either buckle or deform at the point of contact with the tool head 20. Once extracted the insulated wires may be stripped and connected up in the standard manner. And, the length of shielding 31 may be soldered, crimped or mechanically attached to a suitable connection or may be connected to a multitude of different connectors or fittings.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A hand-held tool for extracting a portion of one end of an insulated wire enclosed within a braided shielded cable from an opening in the shield with a minimum of damage to the wire insulation, said tool comprising:

an elongated cylindrically-shaped body large enough to be held comfortably in the palm of a hand, said body having a closed end and an arcuately-shaped tapered head portion;

said tapered head portion having a rounded tip to prevent puncturing said insulation when said tip is inserted between said wire insulation and said braided shield, the outer ½ of said tapered head portion having a substantially elliptical cross section.

2. The tool of claim 1 wherein said arcuately-shaped head has a radius less than 1" and greater than ¼".

3. The tool of claim 2 wherein said body is a solid material.

4. The tool of claim 3 wherein said tapered head portion has a smooth surface to facilitate sliding of said wire insulation over said tapered head portion.

5. The tool of claim 2 wherein said body includes first and second side wall portions.

* * * * *